United States Patent [19]
Rosado et al.

[11] Patent Number: 5,327,998
[45] Date of Patent: Jul. 12, 1994

[54] LUBRICATION BY SUBLIMATION

[75] Inventors: Lewis Rosado, West Carrollton; Nelson H. Forster, Dayton; Christopher J. Klenke, South Vienna, all of Ohio

[73] Assignee: The United States of America as represented by the Secretary of the Air Force, Washington, D.C.

[21] Appl. No.: 946,710

[22] Filed: Sep. 18, 1992

[51] Int. Cl.⁵ .......................... F16N 7/30; F01M 5/00
[52] U.S. Cl. .................................. 184/55.1; 184/6.22; 184/6.26; 184/104.1; 427/248.1
[58] Field of Search ................. 184/6.21, 6.22, 6.26, 184/104.1, 55.1; 427/248.1, 249

[56] References Cited

U.S. PATENT DOCUMENTS

| | | | |
|---|---|---|---|
| 3,644,133 | 2/1972 | Nelson | 117/31 |
| 3,725,276 | 4/1973 | Ohkage | 252/25 |
| 4,316,921 | 2/1982 | Taylor et al. | 427/249 |
| 4,399,168 | 8/1983 | Kullander et al. | 427/248.1 |
| 4,465,604 | 8/1984 | King | 252/37.2 |
| 4,637,493 | 1/1987 | Ehlert | 184/55.1 |
| 5,163,757 | 11/1992 | Graham | 384/463 |

*Primary Examiner*—Thomas E. Denion
*Attorney, Agent, or Firm*—Bobby D. Scearce; Donald J. Singer

[57] ABSTRACT

System and method for high temperature lubrication of a bearing surface of a movable machine part using lubricant sublimation is described which comprises a source of solid lubricant, a heater disposed in thermal contact with the lubricant for heating the lubricant to sublimation and a conduit for conducting sublimated lubricant vapors into contact with the bearing surface to be lubricated.

11 Claims, 1 Drawing Sheet

LUBRICATION BY SUBLIMATION

RIGHTS OF THE GOVERNMENT

The invention described herein may be manufactured and used by or for the Government of the United States for all governmental purposes without the payment of any royalty.

BACKGROUND OF THE INVENTION

The present invention relates generally to systems and methods for lubricating movable machine parts, and more particularly to a novel sublimation system and method for providing high temperature, low friction lubrication to bearing surfaces.

Operation of bearings, gears, cams and other mechanical components in conventional gas turbine and automotive engines are generally limited to temperatures of about 350–400° F. because the conventional liquid lubricants used in the engines usually thermally decompose above about 400° F. Advanced turbine engines and other high temperature engine types (stirling, adiabatic, diesel) may require bearing operation above 1000° F. and therefore require alternate lubrication systems. Conventional solid lubricants such as molybdenum disulfide ($MoS_2$) and tungsten disulfide ($WS_2$) are useful to about 800° F. and may be used in coating or powder form. Advanced solid lubricants such as cesium oxythiotungstenate ($Cs_2WOS_3$) and other complex chalcogenide lubricants, either in coating or in powder form, have been shown to perform well at temperatures above 1200° F. However, specialized equipment for pretreating bearing surfaces and applying a lubricant coating thereon, or for delivering the powder form to the bearing surfaces, in the utilization of advanced lubricants in either coating or powder form may be required.

The invention solves or substantially reduces in critical importance problems with existing lubricant systems by providing system and method for supplying lubricant to high temperature operating bearing surfaces by heating a selected solid lubricant to vapor form and conducting the lubricant vapor, by sublimation, to the bearing surface to be lubricated.

The invention provides numerous advantages over previously known lubrication techniques for high temperature engine applications, including improved engine performance through higher operating temperature capability, and the elimination of any need for coating processes, powder delivery systems, large lubricant reservoirs or lubricant scavenge and supply pumps.

It is therefore a principal object of the invention to provide improved system and method for lubricating bearing surfaces of moving machine parts.

It is another object of the invention to provide system and method for high temperature lubrication of machine parts.

It is a further object of the invention to provide system and method for high temperature lubrication of machine parts using lubricant sublimation.

These and other objects of the invention will become apparent as a detailed description of representative embodiments of the invention proceeds.

SUMMARY OF THE INVENTION

In accordance with the foregoing principles and objects of the invention, system and method for high temperature lubrication of a bearing surface of a movable machine part using lubricant sublimation is described which comprises a source of solid lubricant, a heater disposed in thermal contact with the lubricant for heating the lubricant to sublimation and a conduit for conducting sublimated lubricant vapors into contact with the bearing surface to be lubricated.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
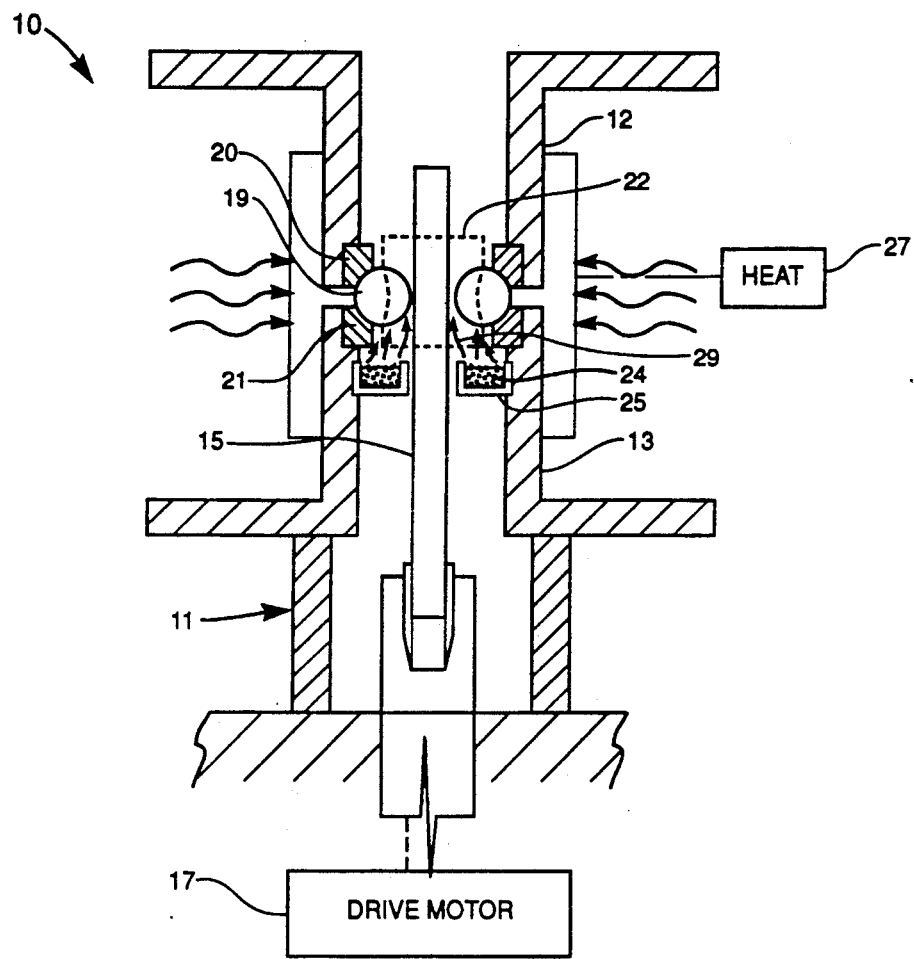
FIG. 1 is a schematic of a test system used for demonstrating sublimation lubrication according to the invention.

In accordance with a governing principle of the invention, a solid lubricant, as a coating, powder or other form, is transformed by heating to a vapor which is transported, by a carrier gas, convection or otherwise, into bearing surfaces to provide lubrication. FIG. 1 shows a schematic of test system 10 used in demonstration of lubrication by sublimation according to the invention. For the demonstration tests, system 10 comprised a modified ball-on-rod rolling contact fatigue tester 11, including an assembly (by suitable assembly means, not shown) of first and second (upper and lower) housing members 12,13 within which a silicon nitride ($Si_3N_4$) test rod 15, rotatably driven by motor 17, was journaled into $Si_3N_4$ balls 19 held by a pair of tapered $Si_3N_4$ races 20,21 and clevite ball retainer 22. Rod 15, balls 19 and retainer 22 were all uncoated members and thoroughly cleaned prior to each test. Solid $Cs_2WOS_3$ lubricant powder 24 was placed into Inconel cup 25 below the ball 19/rod 15 contact area as suggested in FIG. 1. In each test, tester 11 was preheated for about 1½ hours at 1250° F. near powder 24 utilizing heater 27 in thermal contact with the walls of members 12,13. Tests were performed at nominally 1250° F., 3600 rpm and 630 ksi contact stress in the ball 19/rod 15 contact area for extended periods of time (15 to 54 hr). Sublimated lubricant vapors 29 were deposited (or condensed) onto balls 19, rod 15 and retainer 22 in the contact area. The measured temperature in the contact area was about 1190° F., and the bottom of cup 25 was about 1000° F. Low friction measurements and low vibration were recorded throughout the tests. Upon disassembly of test system 10, the ball 19/rod 15 contact area exhibited a glassy appearance. Scanning electron microscope analysis performed on the surfaces of rod 15, balls 19 and retainer 22 showed trace amounts of cesium and tungsten present in the bearing rolling contact after several hours of test. Although the tests were conducted using $Cs_2WOS_3$ lubricant powder at a temperature of 1250° F., any of other solid lubricants which sublime without substantial decomposition upon application of heat to appropriate temperature may be used in successful practice of the invention, such as molybdenum disulfide, tungsten disulfide, zinc oxythiomolybdate and cesium oxythiomolybdate with or without an additive or binder such as sodium silicate, for use at various operating temperatures in the range of about 800 to 1300° F. The preferred lubricants resist decomposition to about 1300° F. Other solid lubricants suitable for use in the practice of the invention may be selected by one skilled in the art guided by these teachings.

Figure 2:
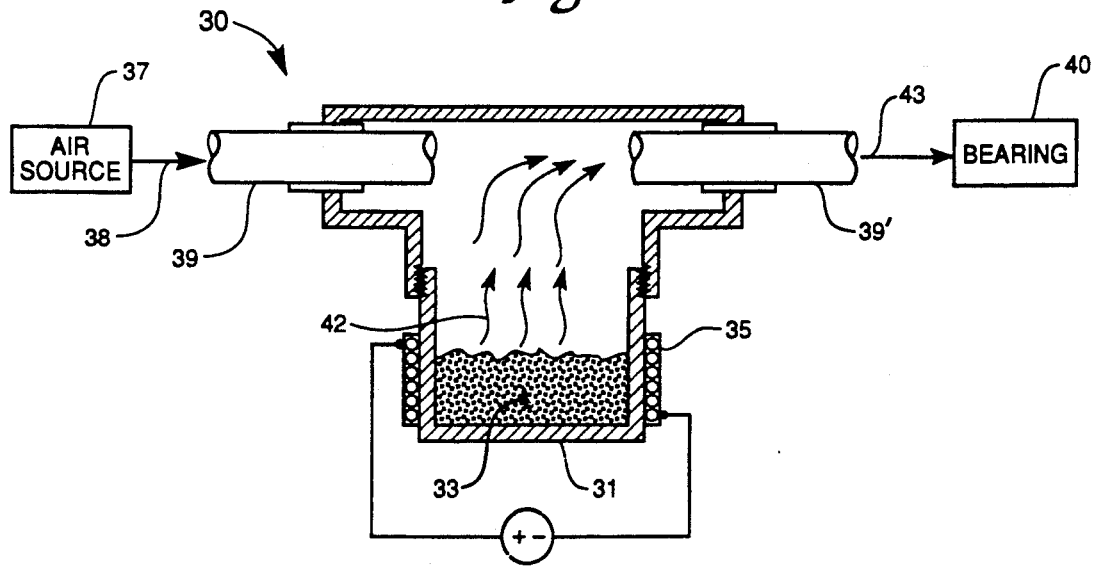
FIG. 2 is a schematic of a representative lubricant delivery system for lubrication by sublimation according to the invention.

A system for delivering sublimated lubricant vapors to a selected bearing surface to be lubricated in the practice of the invention may be constructed substantially as suggested in FIG. 1, wherein heated source of lubricant 24 is disposed near a selected bearing surface and sublimated vapors from source 24 are allowed to rise as by convection into contact with, and to deposit or condense on, the selected bearing surface. FIG. 2 schematically shows an alternative representative lubricant delivery system 30 for lubrication by sublimation according to the invention wherein the sublimated vapors are carried by a vaporous carrier medium (gas) to a selected bearing surface to be lubricated. System 30 may comprise a separable chamber 31 of any suitable size, shape and material of construction (such as Inconel or other thermally conductive high temperature alloy material such as Monel, Hastelloy, AISI 321 or AISI 347) for containing any suitable solid (usually powder or compact) lubricant 33 such as may be selected from those listed above. Heater 35 is disposed in thermal contact with chamber 31 for heating lubricant 33 above the sublimation temperature thereof; in the alternative, chamber 31 itself may be constructed as a resistance heater. Source 37 of suitable (preferably preheated) vaporous carrier medium, such as air, is disposed to provide selected flow 38 thereof through conduit 39,39' and chamber 31 to bearing surface 40 to be lubricated. Vapors 42 from the sublimation of lubricant 33 fill chamber 31, are combined with flow 38, and are carried as flow 43 to bearing 40. It may be noted that the system suggested in FIG. 2 may be configured to be orientation insensitive, and may therefore be used in either positive, zero or negative gravity environments. System 30 may be particularly desirable for very high temperature (800-1300° F.) advanced engine lubrication applications in which reduction in system weight, volume, cost and complexity are desired.

The invention therefore provides system and method for high temperature lubrication of machine parts using lubricant sublimation. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A method for lubricating a bearing surface of a movable machine part, comprising the steps of:
   (a) providing a source of solid lubricant;
   (b) sublimating said solid lubricant to form a lubricant vapor; and
   (c) conducting said lubricant vapor to said bearing surface for condensation of said solid lubricant thereon.

2. The method of claim 1 further comprising the step of combining said lubricant vapor with a vaporous carrier medium for conducting said lubricant vapor to said bearing surface.

3. The method of claim 1 wherein said lubricant comprises a material selected from the group consisting of cesium oxythiotungstenate, molybdenum disulfide, tungsten disulfide, zinc oxythiomolybdate and cesium oxythiomolybdate.

4. The method of claim 3 wherein said source is selected from the group consisting of a member coated with said lubricant, a powder of said lubricant, and a compact of said powder with a binder.

5. The method of claim 1 wherein the step of sublimating said solid lubricant is performed by heating said solid lubricant to a temperature in excess of 800° F.

6. A system for lubricating a bearing surface of a movable machine part, comprising:
   (a) a source of solid lubricant;
   (b) means in operative thermal contact with said source to sublimate said solid lubricant to form a lubricant vapor from said solid lubricant; and
   (c) conduit means for conducting said lubricant vapor into contact with said bearing surface for condensation thereon of said solid lubricant.

7. The system of claim 6 wherein said lubricant comprises a material selected from the group consisting of cesium oxythiotungstenate, molybdenum disulfide, tungsten disulfide, zinc oxythiomolybdate and cesium oxythiomolybdate.

8. The system of claim 7 wherein said source is a compact comprising a powder of said selected lubricant combined with a binder.

9. A system for lubricating a bearing surface of a movable machine part, comprising:
   (a) a source of solid lubricant;
   (b) means in operative thermal contact with said source for heating said source to sublimate said solid lubricant to form a lubricant vapor from said solid lubricant;
   (c) a source of vaporous carrier medium; and
   (d) conduit means for combining said lubricant vapor and said carrier medium and conducting said lubricant vapor and carrier medium into contact with said bearing surface for condensation thereon of aid solid lubricant.

10. The system of claim 9 wherein said lubricant comprises a material selected from the group consisting of cesium oxythiotungstenate, molybdenum disulfide, tungsten disulfide, zinc oxythiomolybdate and cesium oxythiomolybdate.

11. The system of claim 10 wherein said source is a compact comprising a powder of said selected lubricant combined with a binder.

* * * * *